Jan. 9, 1945.  C. W. GREENE  2,366,853

METHOD OF MANUFACTURING FLEXIBLE HOSE

Filed Aug. 7, 1942

INVENTOR.
CHARLES W. GREENE
BY
ATTORNEY

Patented Jan. 9, 1945

2,366,853

UNITED STATES PATENT OFFICE 2,366,853

METHOD OF MANUFACTURING FLEXIBLE HOSE

Charles W. Greene, Toledo, Ohio, assignor to The Flex-O-Tube Company, a corporation of Delaware Application August 7, 1942, Serial No. 454,067

6 Claims. (Cl. 154—8)

This invention relates to the method of manufacturing braided hose or like structures.

Because of the fact that various types of flexible hose are not self-supporting during braiding or weaving, it is necessary to manufacture the same on mandrels which presents a difficult problem in removing the finished hose from the mandrel.

Accordingly, it is the object of the instant invention to provide an improved method of manufacturing braided hose wherein the hose may be removed easily from the mandrel over which it is manufactured.

Other objects will become apparent by reference to the following detailed description taken in connection with the accompanying drawing, in which.

Figure 1:
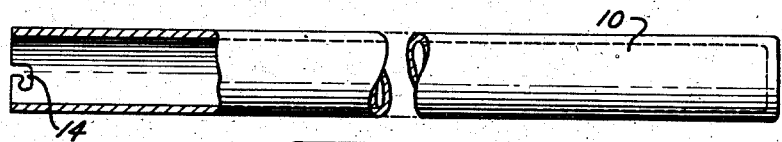
Fig. 1 is a longitudinal view part in section and part in elevation of a mandrel over which flexible hose is braided.
Figure 2:
Fig. 2 is a longitudinal view part in section and part in elevation of the mandrel shown in Fig. 1 wax coated prior to braiding a hose thereover.
Figure 3:
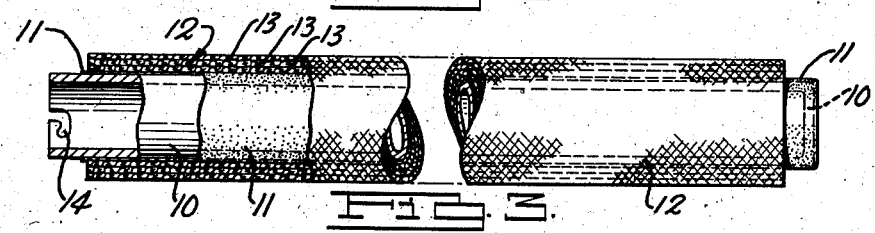
Fig. 3 is a longitudinal view part in section and part in elevation similar to Figs. 1 and 2 showing a hose braided over the waxed mandrel.

Referring now to the drawing wherein like numerals refer to like and corresponding parts throughout the several views, the novel method of manufacturing braided hose or the like disclosed in the drawing for the purpose of illustrating the invention comprises the providing of a smooth brightly finished or polished mandrel 10 which is coated by dipping or otherwise with a thin coating 11 of a hard high temperature wax such as carnauba wax, or candelilla wax, or a high temperature amorphous paraffin wax, or a blend thereof, or a compound of waxes and the like, hard at room temperatures and having a high melting point, preferably from 140 to 185 degrees Fahrenheit The hard wax or composition coating 11 must be of sufficient hardness to support the strands of the hose 12 braided or woven thereover and, while the said wax coating is at room temperature, maintain the said hose 12 in spaced relationship with respect to the mandrel 10.

Figure 4:
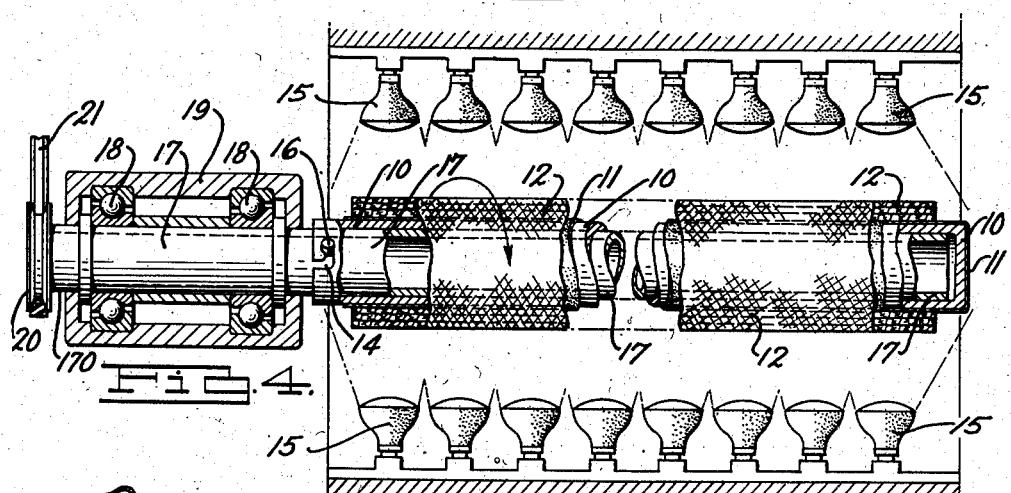
Fig. 4 is a more or less diagrammatic view showing how the braided hose may be mobilized with respect to the mandrel.

After providing the said mandrel 10 with a suitable hard wax coating 11, a hose 12 composed of one or more layers 13 of cotton, fibre glass or the like is braided or woven thereover. The said wax coated mandrel having the hose 12 braided thereover is then subjected to sufficient heat to melt the wax coating and mobilize the hose 12 with respect to the mandrel; the said hose 12 absorbing sufficient of the wax coating 11 to reduce the pressure of the woven hose 12 on the mandrel while the melted wax 11 serves as a lubricant to admit of ease in withdrawing the hose 12 from the mandrel 10.

Where the material from which the hose 12 is woven is of low capillarity and it is possible for heat to penetrate from the outside of the hose 12 to the wax coating 11 on the mandrel 10 without deleterious excessive heating of the hose 12, then, heat to melt the wax is preferably applied from the outside of the hose 12 by employing a plurality of infra-red lamps and turning the mandrel on which the hose is woven during the heating thereof as illustrated in Fig. 4. In the majority of instances this method will give the best results inasmuch as, when the infra-red rays penetrate the hose 12 and wax coating 11 and heat the surface of the mandrel 10 so that the surface of the mandrel 10 is above the melting point of the wax coating 11, the hose 12 is at a temperature, say from 25 to 50 degrees Fahrenheit, above the temperature of the melted wax 11 which materially increases the capillarity of the hose 12 with respect to the melted wax 11. With the hose 12 progressively hotter from the inside out, a large proportion of the melted wax coating 11 upon becoming melted dissipates readily into the hose 12 while the remainder of the molten wax serves as a lubricant between the hose 12 and the mandrel 10 whereupon the hose 12 becomes completely mobile with respect to the mandrel 10. The turning or rotating of the mandrel during heating assures evenness of heating and absorption of the wax by the hose, hence assuring complete mobility of the hose with respect to the mandrel.

Figure 5:
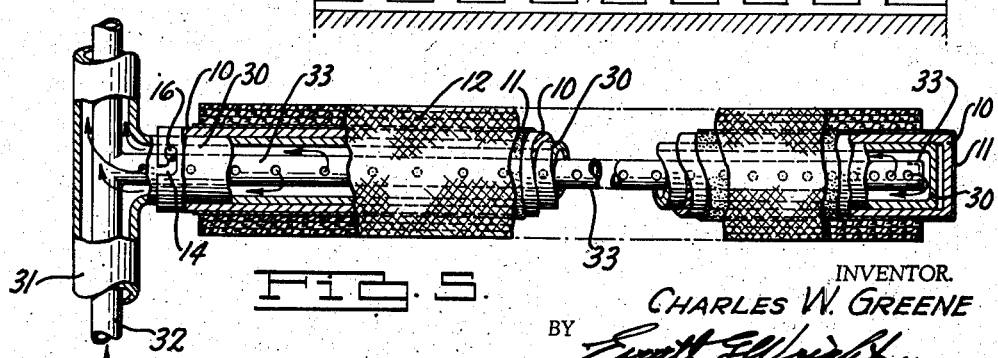
Fig. 5 is a more or less diagrammatic view showing an alternate method of mobilizing the hose with respect to the mandrel.

In the event of employing infra-red lamps 15 as a source of heating as illustrated in Fig. 4, bayonet slots 14 of the mandrel 10 cooperate with oppositely disposed nibs 16 extending from a slowly rotating shaft 17 over which a mandrel 10 is telescoped. This bayonet connection or other anchorage of the mandrel 10 to the slowly rotating shaft 17 causes the mandrel 10 to rotate with the said rotating shaft 17 and anchors the said mandrel 10 while the hose 12 is withdrawn manually therefrom. The said rotating shaft 17 is cantilevered from and rotates slowly on such means as a pair of spaced thrust ball bearings 18 fixed in a suitable support 19. A pulley 20 keyed on the end 170 of the shaft 17 extending from the support 19 and the V-belt drive 21 connected to a suitable source of power are employed to rotate the said shaft 17 and the mandrel 10 thereon. When sufficient heating time has elapsed to heat the hose 12, melt the wax 11, and heat the surface of the mandrel 10 above the melting point of the wax 11, the infrared lamps 15 and the source of power rotating the mandrel 10 are shut off, and the hose 12 is withdrawn from the mandrel 10. The mandrel 10 is then removed from the rotating shaft 17 and is cleaned, cooled and otherwise made ready for a subsequent cycle of operation.

Where the material from which the hose 12 is woven is of sufficient capillarity to absorb the wax readily when raised to its melting point, or when reflective or other coatings are applied to the outside of the hose 12 or between the layers 13 thereof, then, heat to melt the wax coating 11 on the mandrel 12 and dissipate the wax 11 into the hose 12 may be applied from the inside as illustrated in Fig. 5.

In the event of employing steam heat to heat the mandrel 10 from within sufficient to melt the wax coating 11 between the hose 12 and mandrel 10, equipment such as illustrated in Fig. 5 may be used. A stationary heating element 30 cantilevered from a steam return main 31 telescopingly receives the mandrel 10; bayonet slots 14 of the said mandrel 10 cooperating with oppositely disposed nibs 16 extending from the said heating element 30. This bayonet connection or other anchorage of the mandrel 10 to the heating element 30 holds the mandrel 10 onto the said heating element 30 when the hose 12 is withdrawn therefrom. Live steam supplied to the heating element 30 through a steam supply line 32 and apertured jet 33 passes into the said heating element 30 and out therefrom into the said steam return main 31 as indicated by the arrows in Fig. 5. When sufficient heating time has elapsed to heat the mandrel 10 and melt the wax coating 11 thereon, the hose 12 is withdrawn from the mandrel 10. The mandrel 10 is then removed from the heating element 30 and is cleaned, cooled and otherwise made ready for a subsequent cycle of operation.

Although but two modified forms of the invention have been disclosed and described herein, the novel method and method steps comprising the invention may be altered and changed as required to accommodate the invention to varying conditions encountered when practicing the invention, all without departing from the scope of the invention as defined by the appended claims.

I claim:

1. The method of manufacturing braided hose comprising the wax coating of a polished mandrel, braiding hose over the said waxed mandrel, and applying penetrating heat to said woven hose from the outside thereof sufficient to raise the temperature of the hose to a temperature progressively hotter from the inside out until the wax becomes molten whereby to create a condition of maximum capillary attraction of the wax to the hose causing a portion of the wax to dissipate into the hose while the remainder serves as a lubricant between the hose and the mandrel, and withdrawing the said hose from said mandrel.

2. The method of manufacturing braided hose comprising the wax coating of a polished mandrel with a wax solid at room temperatures and while reinforced by said mandrel to support the braiding of a hose thereover and to space said braided hose from the mandrel, braiding hose over the said waxed mandrel while said wax is at room temperature with braiding material composed of thread-like strands applied under such tension as not to penetrate through said wax into contact with said mandrel, and applying penetrating heat to said woven hose from the outside thereof sufficient to raise the temperature of the hose to a temperature progressively hotter from the inside out until the wax becomes molten whereby to create a condition of maximum capillary attraction of the wax to the hose causing a portion of the wax to dissipate into the hose while the remainder serves as a lubricant between the hose and the mandrel, and withdrawing the said hose from said mandrel.

3. The method of manufacturing braided hose comprising the wax coating of a polished mandrel hardenable at room temperatures and having a melting point from 140° to 185° Fahrenheit, braiding hose over the said waxed mandrel, and applying penetrating heat to said woven hose from the outside thereof sufficient to raise the temperature of the hose to a temperature progressively hotter from the inside out until the wax becomes molten whereby to create a condition of maximum capillary attraction of the wax to the hose causing a portion of the wax to dissipate into the hose while the remainder serves as a lubricant between the hose and the mandrel, and withdrawing the said hose from said mandrel.

4. The method of manufacturing braided hose comprising the wax coating of a polished mandrel, braiding hose over the said waxed mandrel, slowly rotating the mandrel and simultaneously applying penetrating heat to said woven hose from the outside thereof sufficient to raise the temperature of the hose to a temperature progressively hotter from the inside out until the wax becomes molten whereby to create a condition of maximum capillary attraction of the wax to the hose causing a portion of the wax to dissipate into the hose while the remainder serves as a lubricant between the hose and the mandrel, and withdrawing the said hose from said mandrel.

5. The method of manufacturing braided hose comprising the wax coating of a polished mandrel with a wax solid at room temperatures and while reinforced by said mandrel to support the braiding of a hose thereover and to space said braided hose from the mandrel, braiding hose over the said waxed mandrel, while said wax is at room temperature with braiding material composed of thread-like strands applied under such tension as not to penetrate through said wax into contact with said mandrel, slowly rotating the mandrel and simultaneously applying penetrating heat to said woven hose from the outside thereof sufficient to raise the temperature of the hose to a temperature progressively hotter from the inside out until the wax becomes molten whereby to create a condition of maximum capillary attraction of the wax to the hose causing a portion of the wax to dissipate into the hose while the remainder serves as a lubricant between the hose and the mandrel, and withdrawing the said hose from said mandrel.

6. The method of manufacturing braided hose comprising the wax coating of a polished mandrel hardenable at room temperatures and having a melting point from 140° to 185° Fahrenheit, braiding hose over the said waxed mandrel, slowly rotating the mandrel and simultaneously applying penetrating heat to said woven hose from the outside thereof sufficient to raise the temperature of the hose to a temperature progressively hotter from the inside out until the wax becomes molten whereby to create a condition of maximum capillary attraction of the wax to the hose causing a portion of the wax to dissipate into the hose while the remainder serves as a lubricant between the hose and the mandrel, and withdrawing the said hose from said mandrel.

CHARLES W. GREENE.